United States Patent [19]

Gates

[11] Patent Number: 5,311,781
[45] Date of Patent: May 17, 1994

[54] FLOWMETER FOR OBJECT-BEARING LIQUIDS

[75] Inventor: Wendall C. Gates, Santa Cruz, Calif.

[73] Assignee: Advanced Instrumentation Inc., Santa Cruz, Calif.

[21] Appl. No.: 27,262

[22] Filed: Mar. 5, 1993

Related U.S. Application Data

[63] Continuation of Ser. No. 829,810, Feb. 3, 1992, abandoned, which is a continuation-in-part of Ser. No. 594,729, Oct. 9, 1990, abandoned.

[51] Int. Cl.⁵ .................................................. G01F 1/66
[52] U.S. Cl. .............................. 73/861.25; 73/861.18; 73/861.21
[58] Field of Search ............ 73/861.18, 861.25, 861.21, 73/861.41

[56] References Cited

U.S. PATENT DOCUMENTS

| | | | |
|---|---|---|---|
| 3,890,568 | 6/1975 | Coulter et al. | 377/11 |
| 4,480,466 | 11/1984 | Gates | 73/195 |
| 4,905,206 | 2/1990 | Nishiyama et al. | 73/861.25 X |
| 4,944,189 | 7/1990 | Nakajima et al. | 73/861.25 |
| 4,955,386 | 9/1990 | Nishiyama et al. | 73/861.25 X |
| 5,109,857 | 5/1992 | Roundhill et al. | 73/861.25 X |
| 5,113,867 | 5/1992 | Janszen | 73/861.25 X |
| 5,188,112 | 2/1993 | Sturgill et al. | 73/861.25 X |
| 5,198,989 | 3/1993 | Petroff | 73/861.25 X |

*Primary Examiner*—Richard E. Chilcot, Jr.
*Assistant Examiner*—Elizabeth L. Dougherty
*Attorney, Agent, or Firm*—Townsend and Townsend Khourie and Crew

[57] ABSTRACT

The flowmeter of this invention computes the volumetric flow rate of a liquid by measuring the changing positions of objects carried in the flow. This information can be combined with data describing the size, shape and fraction of filling of the conduit. By measuring displacement instead of velocity, accurate measurements of liquid movement can be obtained even when flows are moving very slowly, or not at all.

10 Claims, 3 Drawing Sheets

FLOWMETER FOR OBJECT-BEARING LIQUIDS

This is a continuation of Ser. No. 07/829,810 filed Feb. 3, 1992, now abandoned which is a continuation-in-part of the copending application of the same title, Ser. No. 07/594,729, filed Oct. 9, 1990 now abandoned.

BACKGROUND OF THE INVENTION

Accurate measurement of wastewater flows in sewers and other open channels is increasingly important for both economic and environmental reasons. Existing flowmeters for open channels are of two types: head-type meters which measure water depth and are used with weirs and flumes; and velocity-area (VxA) meters which obtain flow cross section area from a measurement of depth and multiply this area by a factor based on a measurement of water velocity. Properly installed head-type meters are 1–2% accurate; VxA meters are typically at least an order of magnitude less accurate, but can be used where installation of a flume or weir is impractical or impossible.

The common weakness of VxA meters is in the measurement of water velocity. Techniques commonly used for wastewater velocity measurement are contrapropagating and reflective ultrasonics (both based on frequency shifting), electromagnetic probes, and (for short-term measurements) paddlewheels and turbines. Such devices are typically rated for velocity ranges to 30 fps (feet per second) and higher; accuracy is severely degraded at low velocities. The velocities found in open channel wastewater flows range from typical highs of 3 to 5 fps in free flow down to zero or even reverse flow under stoppage conditions.

In open channel flow applications, present velocity-measuring instruments are at best operating in the bottom 10–15% of their full range, with resulting poor accuracy. Electromagnetic probes are especially prone to fouling, with resultant calibration drift, in slowly moving flows. In wastewater flows, paddlewheel, turbine, target and other intrusive sensors typically fail in short times due to fouling and trash accumulation. There is a great need for an open channel flowmeter for wastewater which can operate accurately in pipes and channels (without using a weir or flume) which is not subject to the shortcomings of velocity measurements.

Several manual techniques are in common use for measuring water flowrate in channels without measuring velocity. These methods measure the movement of the water along the channel over a measured distance in a measured time, as contrasted with measuring the instantaneous water velocity at the location of the velocity sensor. The simplest of these techniques is the method of floats; small floats are dropped into the flow and visual measurements are taken of the travel time to a known point downstream. The water flowrate is computed as:

$$\text{Flowrate} = \frac{\text{distance between points} \times \text{Cross-section Area of flow}}{\text{travel time}}$$

It is possible to compute a value for "average" velocity, dividing the travel distance by the travel time. The result is a fictitious value, which for most situations will not be the actual velocity of any significant portion of the flow. Regardless, this "average velocity" is a derived value; it is not a measurement, and it not required for the calculation of flowrate.

The same principle underlies dye and salt techniques. Dye may be dumped into moving water, and the time of travel observed visually. Salt may be dumped into the water, and the time of arrival at the downstream point observed with a conductivity meter. These techniques are characterized by low resolution in distance and time measurements, requiring the measurements to be made over large distances and times; rapid changes of flowrate are averaged out rather than measured. Also, for each measurement, material must be added to "tag" the water. On the positive side, the lack of velocity measurement means these techniques work equally well, though inaccurately, in both fast and slow flows. To date, this benefit has not been realized in an automated instrument because of these problems of the long baseline and need to continuously add "tagging" material.

The present invention solves these problems by using the solids already being carried by the flowing water, and by providing a precise, short-baseline method for accurately measuring the travel distances of such solids. The invention successively identifies and measures the location of individual solids at short time intervals and calculates the liquid flowrate based on the movement of these solids. Because solids are carried throughout the flow, the technique measures throughout the cross section of flow; accuracy is not dependent on laboratory-quality flow conditions. The present invention is also useful in flows without measurable solids by introducing bubbles in the flow.

Accordingly, the first object of the invention is to implement a channel flowmeter to continuously measure flowrate by measuring water movement instead of velocity.

Another object of the invention is to measure the water movement using short baselines and short times, for installation convenience and to better track short-term variations in flowrate.

Another object of the invention is to perform such non-velocity flow measurements without the addition of tagging material to the flowing water.

Another object of the invention is to take measurements throughout the flow, preserving accuracy where flow conditions are irregular.

Another object of this invention is to provide a volumetric flowmeter which accurately computes a true flow volume regardless of flow velocity, does not require a known flow profile, and is essentially independent of upstream and downstream flow conditions, including flow stoppages.

Another object of this invention to provide a volumetric flowmeter which can be used in the same applications as velocity-area meters, but which avoids the shortcomings of velocity measurement.

Another object of this invention is to provide an accurate method of measuring flowrates of object-bearing liquids moving slowly.

SUMMARY OF THE INVENTION

Broadly speaking, the flowmeter of this invention computes the volumetric flow rate of a liquid by measuring the changing positions of objects carried in the flow. This information can be combined with data describing the size, shape and fraction of filling of the conduit. By measuring displacement instead of velocity, accurate measurements of liquid movement can be obtained even when flows are moving very slowly, or not at all.

Objects carried in flowing liquids tend to be distributed through the flowing liquid, so object travel measurements can be taken at many points in the cross section of flow. Using echo-ranging techniques, object positions can be measured remotely from the sensor, and thus moving a sensor to each measurement point (the traditional method for multipoint measurement using velocity meters) is not required.

While the method may be implemented using a variety of techniques, the implementation described is constructed using ultrasonic echo-ranging transducers.

DESCRIPTION OF THE PREFERRED EMBODIMENT

Figure 1:
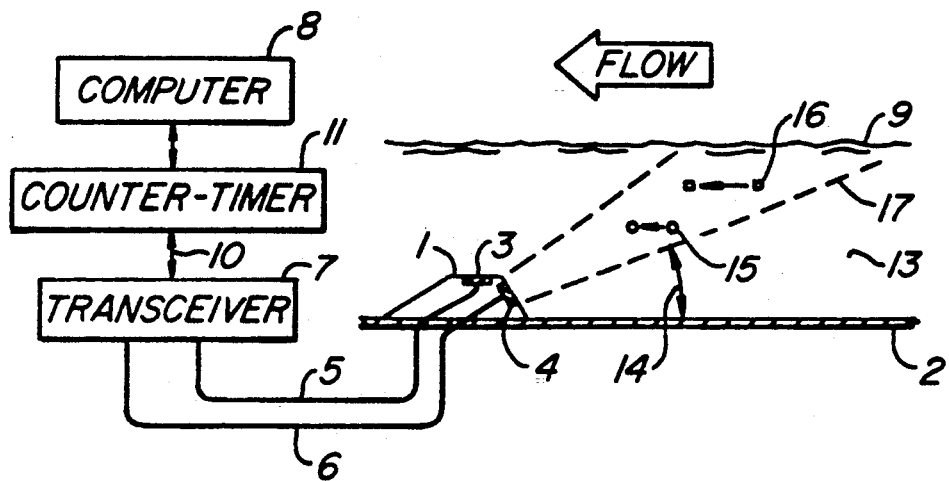
FIG. 1 is an illustration in block diagrammatic form of one embodiment of a flowmeter constructed in accordance with the principles of this invention.

Referring to FIG. 1, there is illustrated one embodiment of the basic elements of a flowmeter of this invention designed to measure open channel flow, i.e., flow in a conduit in which the flow depth is variable. A sensor holder 1 is located near the bottom of a conduit 2 of known size and shape. In the illustrated embodiment, both sensor 3 and sensor 4 are piezoelectric crystals which emit pulses of ultrasonic energy in response to voltage variation in their respective electrical cables 5 and 6. Returning ultrasonic energy striking either sensor 3 or sensor 4 is converted to an electric voltage signal, which is transmitted to transceiver 7 through cable 5 or cable 6, respectively. Transceiver 7 is controlled by computer means 8.

In operation, transceiver 7 causes liquid depth sensing piezoelectric crystal 3 to emit ultrasonic energy upwards toward the liquid surface 9, from which some of the ultrasonic energy is reflected back downward. The returning ultrasonic energy generates a voltage in liquid depth sensing crystal 3, which voltage is transmitted to transceiver 7 through cable 5. Transceiver 7 transmits a voltage signal through connection 10 to Timer/Counter 11, which in the described embodiment is integrated into computer means 8. The physical arrangement of computer means 8 is not significant to the principles of this invention.

Counter-timer 11 converts the interval between transmission and reception of ultrasonic energy ("echo time") into data for use by computer 8. Computer 8 adjusts the echo time data for temperature effects and then computes distance from sensor 3 to liquid surface 9, using preprogrammed values for propagation velocity. To this computed distance, the computer adds offset 12 of sensor 3 above the invert of conduit 2 to produce a value corresponding to depth of liquid 13 in conduit 2. Having this depth, computer 8 then computes the cross-section area of flowing liquid 13 using preprogrammed data for shape and size of conduit 2.

In applications where a conduit will always be flowing full, often referred to as "closed-pipe" flow, liquid depth sensor 3 is not required, and the flow cross-section area of liquid 13 is presumed to be identical to the cross-section area of conduit 2.

Object travel sensor 4 is also a piezoelectric crystal but is oriented at angle 14 to the direction of flow. Sensor 4 emits ultrasonic energy in response to voltage signals from transceiver 7. Objects 15 and 16, representative of various solid and semisolid objects or bubbles carried by flowing liquid 13, pass through the beam 17 of ultrasonic energy emitted by sensor 4. Some of this ultrasonic energy reflected by objects 15 and 16 strikes sensor 4 and is converted to voltage signals which are returned to transceiver 7 through cable 6. Transceiver 7 supplies distance-related electronic signals to Counter/Timer 11, which in turn produces distance data to computer 8. Computer 8 applies trigonometric corrections for beam angle 14 to calculate displacement of objects 15 and 16 in the direction of flow of liquid 13.

The word "sensor" as used in this disclosure refers to a combination of transducers used to emit and detect ultrasonic energy. A sensor may be a single transducer used as both transmitter and receiver; it may also be constructed as separate transducers which may be collocated or at separated locations. Computer 8 causes the above-described process to reoccur at short time intervals, typically 2-5 times per second.

Because of the nature of sewage (transporting many solids) and the opportunistic nature of these measurements, computer means 8 includes software techniques for processing multiple echo returns and identifying the same object in successive scans. While these techniques are similar in fundamentals to tracking techniques used in radar and sonar systems, the special nature of this application requires unique implementations of these techniques.

The first major difference is that radars and sonars work in the "far field" zone; the target is sufficiently far away that it is essentially at the same distance from all parts of the antenna. Phase cancellation effects are negligible, and the plot of radiated intensity vs. angle from beam center is reasonably smooth. Radars and sonars use this smooth angular graduation of intensity to obtain directional information.

In the present invention, a transducer diameter of less than 1" and required working distances in the range of 4 to 20 inches result in the transducers working in the "near zone" where phase cancellation effects produce an irregular plot of radiation intensity vs center angle. Directional information cannot be obtained from echo strength.

The second major difference is that radar antennae are usually able to rotate, thus allowing both tracking of the target and comparisons of returns at different angles, whereas in the present invention the sensor orientation is typically fixed.

The third major difference is in opportunity for observation. Radar operates at almost light speed and typically can take many scans of a target before the target moves significantly; measurements can be repeated as needed. Wastewater solids or bubbles passing the present flowmeter may be in the window of measurement for less than one second; ultrasound travels 500,000 times slower than light; the targets typically move between scans. The result is that the opportunity for repeat measurements is not available.

Fortunately, a fourth major difference provides great simplification for the present invention: unlike radar or sonar, not every solid or bubble has to be identified and measured. If a travel measurement of one object does not validate, another opportunity will soon arise.

Figure 2:
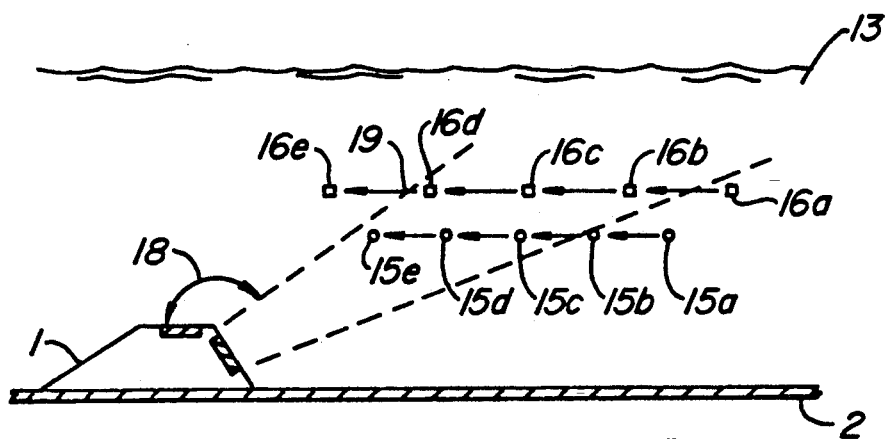
FIG. 2 is an illustration in sectional view of a fluid motion sensor and showing a technique used in this invention for the determination of distance to an object in the measured liquid.
Figure 4:
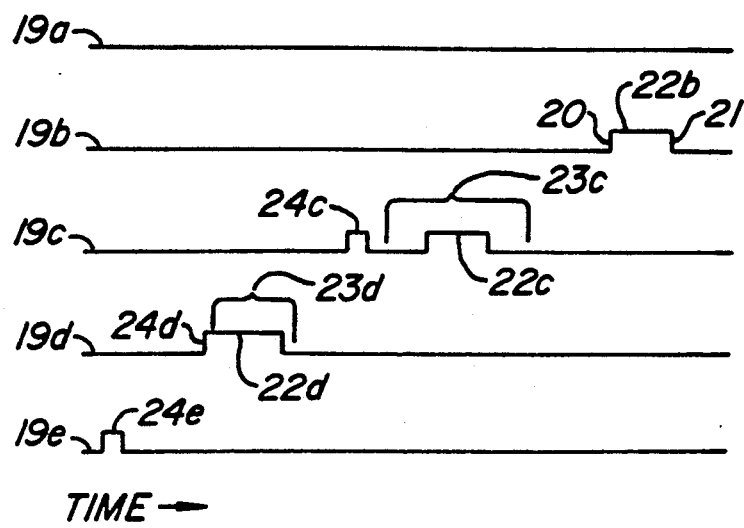
FIG. 4 is an illustration in sectional perspective view of the flow within a conduit being measured using the method of this invention.

The present invention identifies passing objects using a straight forward procedure. Refer to FIG. 2, in which successive positions 15a–15e and 16a–16e are shown for two transported objects 15 and 16. Refer also to FIG. 4, in which are shown demodulated data corresponding to scans 19a–19e taken at times corresponding to object positions a-e. The target identification procedure is:

1. Scan 19a is empty, because no objects are within ultrasonic beam 17.

2. Scan 19b contains sharp-edged transitions 20 and 21 defining echo 22b returned from object 16; object 15 has not yet entered ultrasonic beam 17 and so is invisible to sensor 4. The time to leading edge 20 corresponds to the distance to object 16, and the time between leading edge 20 and falling edge 21 corresponds to the size and reflectivity of object 16. Computer means 8 tentatively identifies echo 22b.

3. Computer means 8 causes scan 19c to be taken and creates "data window" 23c, of size and position based on previously taken data if available, or otherwise on general hydraulic principles. Computer 8 then searches window 23c for an echo of similar size to echo 22b in previous scan 19b.

In scan 19c, echo 23c satisfies this test. The presence of echo 24c from object 15 does not interfere with this test, even if inside window 22.

4. Computer 8 causes scan 19d to be taken, applies a smaller window 23d based on distance and size information from scans 19b and 19c, and verifies the presence of suitable echo consistent with previous data, even though leading edge of echo 22d has been masked by echo 24d.

5. Computer 8 causes scan 19e to be taken. Object 16 has moved out of ultrasonic beam 17 and is no longer visible. Echo 24e is significantly shorter than echoes 22b–22d and is identified by computer 8 as not corresponding to the same object as echoes 22b–22d.

6. Computer means 8 then processes echo times from object 16 into displacements taking into account the trigonometric effects of beam tilt angle 14, and combines time interval, temperature and other preprogrammed data to determine the movement of the liquid.

Computer means 8 controls the effectiveness of echo-ranging by adjusting both the strength of transmission and the sensitivity of detection. Where many objects of varying sizes are simultaneously within ultrasonic beam 17, computer 8 thus can reduce the number of objects detected to a number manageable by an 8-bit microprocessor in a reasonably short time.

Any ultrasonically reflective object travelling with the flow will permit measurements; if sufficient solid objects are not present, bubbles may be introduced into the flow, and effects of bubble rise compensated for in the calculations. Unlike traditional "tagging" methods, in this case the "tagging" material is readily available, inexhaustible and free, requiring only a small, low-power pump to use. In the context of this invention, a bubble is considered to be an "object" because, like a solid, it creates a discontinuity in the liquid which is detected by the sensor.

Figure 3:
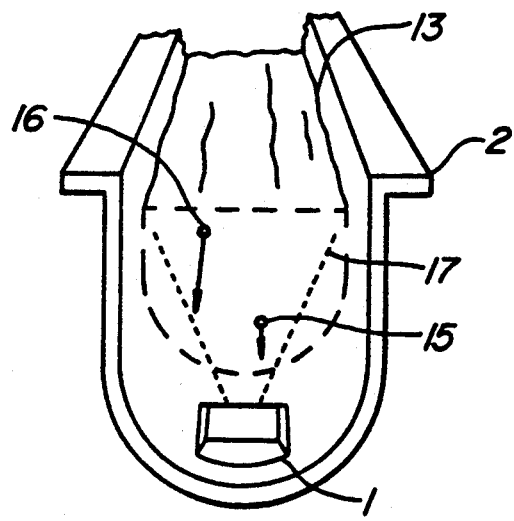
FIG. 3 is an illustration of the echo patterns returned by successive scans showing a technique of identifying echoes from individual objects in the flow.

It is not necessary to determine the actual position of individual objects in the flow to compute the movement of the liquid. Because such objects are randomly distributed throughout the flow, any calculation method which assigns equal weight to each measurement will produce accurate results, provided the ultrasonic beam covers either substantially all of the cross section of flow, or a representative portion thereof. The simplest method is to base the flowrate calculation for the entire cross-section upon the latest travel measurement, using the data from each measured object only until the next measurement is taken; the raw data output will show sharp fluctuations but can be smoothed in the computer means. Other methods of smoothing the data are to retain all measurements for a defined period (for example, the preceding 5 seconds) or to retain some fixed number of the most recent measurements; the calculated flowrate is then based on the aggregate of retained measurements. FIG. 3 shows one embodiment of the invention with sensor holder 1 located on the bottom of conduit and with ultrasonic beam 17 illuminating a substantial portion of the flow cross section.

Figure 5:
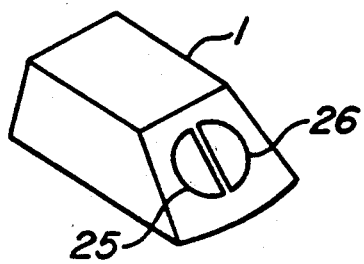
FIG. 5 is an illustration in isometric view of one type of ultrasonic transducer array used for control of directional sensitivity in this invention.

The calculation techniques described above presume that sensor 4 is able to "see" most of the cross-section of the flow. If the flow conduit is substantially the same in both cross dimensions (circular or square), this condition can be adequately satisfied using only one sensor. If the flow conduit is substantially elongated in cross section (wide shallow flows or narrow deep flows), provision may be included to increase the monitored portion of the flow. One such technique is to use an array of divergently pointing sensors. A second technique is shown in FIG. 5, where sensor 4 is subdivided electrically into one or more segments 25 and 26; such segments may be operated to include electronic phase-shifting to change the direction of sensitivity of sensor 4 without physically rotating it. This technique is well known to those skilled in the art of ultrasonic transducers (and in antenna design in general) as "steering the beam". Using this technique, a single fixed sensor can be readily made to "sweep" across the cross-section area of flow.

Computer 8 calculates volumetric flow rate of liquid 13 according to the equation:

$$\text{Flow Rate} = \frac{\text{incremental Flow volume}}{\text{time interval}} = \frac{\text{Flow Area} \times \text{Displacement}}{\text{time interval}}$$

This equation is based on three measurements of distance—one of liquid depth for flow area, and two of distance to an object moving in the stream—and one measurement of time. Such ultrasonic distance measurement is typically accurate to about 0.030" and the object travel is typically measured over about 12", so travel measurement accuracies of 0.5% are easily obtained. Because velocities of moving liquids are small compared to the velocity of sound in such liquids, the accuracy of distance measurement is not significantly affected by velocity, and flow measurement accuracy is maintained at all velocities.

Figure 6:
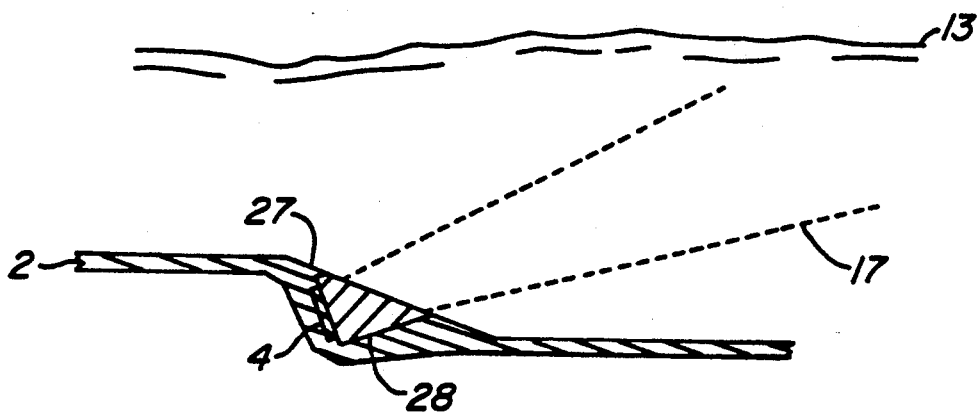
FIG. 6 is an illustration in sectional view of an ultrasonic sensor mounted so as to minimize disturbance of the passing flow, while operating in accordance with the principles of this invention.

Ideally, the presence of sensor holder 1 should not distort the measured flow. Referring to FIG. 6, this condition can be approximated by minimizing the slope of the upstream face 27 of sensor holder 1. However, ultrasonic beam 17 is emitted approximately perpendicular to sensor 4. To avoid inserting face 27 as a near-perpendicular obstruction into the flow, face 27 may be constructed as a wedge 28 of acoustically-transmissive material. The direction of ultrasonic beam 17 is altered by passage through wedge 28 according to Snell's law of refraction. Computer 8 can then compensate for such change of direction. Also, if the sonic propagation velocity in wedge material is substantially the same as in measured liquid 13, the direction of ultrasonic beam 17 will not be significantly changed by passage through wedge 28.

Figure 7:
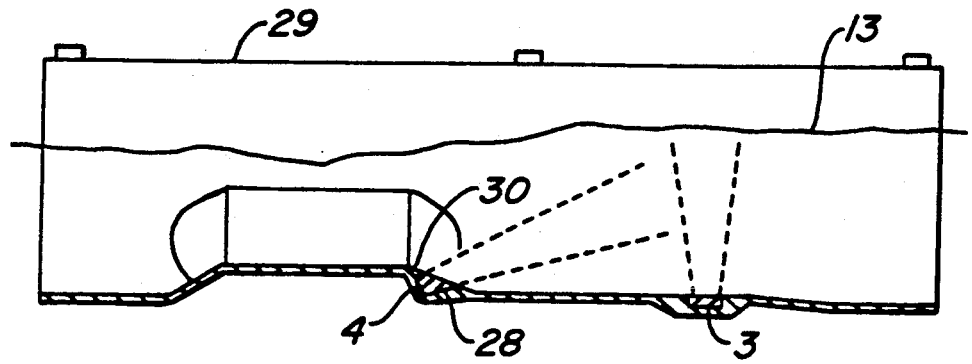
FIG. 7 is an illustration in sectional form of a metering flume with liquid depth and motion sensors mounted in accordance with this invention.

The present invention may be applied to the invention of U.S. Pat. No. 4,480,466 by the same author, replacing the commercially available liquid velocity measuring technique incorporated into that invention. The prior invention can then be programmed to discriminate between normal and submerged flow conditions by comparison of flowrates instead of velocities. In FIG. 7, liquid travel sensor 4 has been incorporated into leading edge 30 of raised throat section of metering flume 29. Wedge 28 has been shaped to match leading edge 30 for minimum distortion of flow. Liquid depth sensor 3 can then be mounted flush with bottom of flume 29, instead of raised into the flow as shown in the cited previous invention.

Figure 8:
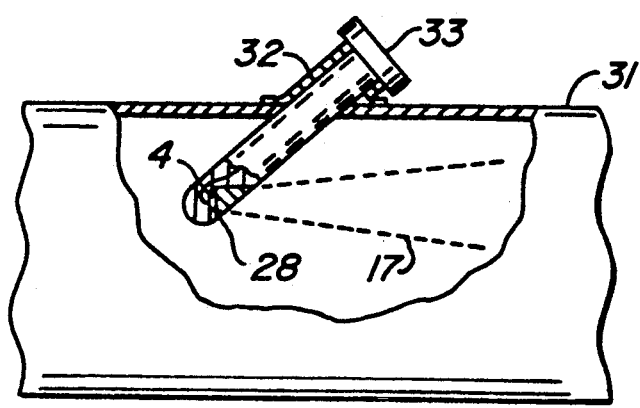
FIG. 8 is an illustration in sectional view of a fluid motion sensor arranged as an insertable probe into a closed conduit, in accordance with the principles of this invention.

FIG. 8 illustrates another embodiment of the principles of this invention as applied to flow measurement in closed conduits. Conduit 31 is fitted with port 32 for the entrance of probe 33, which is slanted downstream to shed waterborne trash. Lower end of probe 33 contains liquid motion sensor 4 and wedge 28 mounted to point upstream. Ultrasonic beam 17 is thus directed upstream to detect reflective objects and compute flowrates as described above using the size and shape of the conduit. This embodiment of the invention may be further modified by the inclusion of a liquid depth sensor for use in applications where the closed conduit 31 may sometimes flow only partially full. Absent the inclusion of a depth measurement, this embodiment is primarily applicable to closed pipe flow where the conduit is assumed to be flowing full.

Various embodiments of this invention may be constructed using various types of sensors. Liquid depth may be measured using a pressure transducer, overhead ultrasonic sensor, float, or optical imaging device. Object displacement may be measured using sonic, infrasonic or electromagnetic energy. The sensors may be located within the conduit or they may be externally mounted, as with clamp-on ultrasonic transducers. Having described several preferred embodiments of the invention, various other embodiments, modifications and improvements will be apparent to those skilled in the art, and the invention should be construed as limited only by the spirit and scope of the appended claims.

What is claimed is:

1. A flowmeter for measuring the movement of an object-bearing liquid in a conduit, the liquid containing one or more objects, the flowmeter comprising:
    an emitter which emits energy into the liquid at successive points in time;
    a receiver which receives energy reflected back from the one or more objects in the liquid at the successive points in time;
    means for converting the reflected energy received by the receiver from the one or more objects into a first set of individual electric signals corresponding to the energy reflected form the one or more objects;
    means for storing the first set of individual electric signals;
    means for comparing the first set of individual electric signals and a second set of individual electrical signals from the successive point in time, the comparing means have a predetermined threshold for comparing the first and second set of individual electrical signals, the comparing means identifying pairs of electric signals, one from the first set and one from the second set, being within the predetermined threshold of each other, each pair of electric signals defining an identified object at the successive points in time; and
    means for determining the displacement of each of the identified objects between the successive points in time.

2. The flowmeter of claim 1 further comprising means for determining the depth of the liquid in the conduit.

3. The flowmeter of claim 2 further comprising means for calculating the flowrate of the liquid in the conduit, the flowrate calculating means being coupled to the depth sensing means and having preselected data describing a size and a shape of the conduit.

4. The flowmeter of claim 1 wherein the emitter emits ultrasonic energy.

5. The flowmeter of claim 1 wherein the receiver includes a wedge of acoustically-transmissive material to minimize disturbance of the flow in the conduit.

6. The flowmeter of claim 2 wherein the emitter includes a first ultrasonic crystal, and the depth determining means includes a second ultrasonic crystal aligned vertically for determining the depth of the liquid.

7. The flowmeter of claim 2 wherein the conduit includes a flume having a flume throat, and the emitter and receiver form a part of the flume throat to minimize disturbance of the flow.

8. The flowmeter of claim 1 wherein the conduit is a wastewater conduit.

9. The flowmeter of claim 1 further comprising:
    a timer which computes the delay between the energy sent by the emitter and reflected energy received by the receiver at said successive points in time, the timer being coupled to the displacement determining means.

10. The flowmeter of claim 1 further comprising:
    means for calculating the velocity of each of the identified objects, the velocity calculating mens being operatively coupled to the displacement determining means.

* * * * *